(12) United States Patent
Roberts et al.

(10) Patent No.: US 9,956,872 B2
(45) Date of Patent: May 1, 2018

(54) CARRIER BEARING ASSEMBLY

(71) Applicant: SANDCRAFT LLC, Mesa, AZ (US)

(72) Inventors: Jonathan Roberts, Glendale, AZ (US); Brent Reynolds, Mesa, AZ (US)

(73) Assignee: Sandcraft, LLC, Mesa, AZ (US)

( * ) Notice: Subject to any disclaimer, the term of this patent is extended or adjusted under 35 U.S.C. 154(b) by 144 days.

(21) Appl. No.: 14/952,741

(22) Filed: Nov. 25, 2015

(65) Prior Publication Data

US 2017/0144538 A1 May 25, 2017

(51) Int. Cl.
*B60K 17/24* (2006.01)
*F16C 35/04* (2006.01)

(52) U.S. Cl.
CPC ............ *B60K 17/24* (2013.01); *F16C 35/042* (2013.01)

(58) Field of Classification Search
CPC ....... B60K 17/24; F16C 35/042; F16C 35/047
See application file for complete search history.

(56) References Cited

U.S. PATENT DOCUMENTS

| | | | | |
|---|---|---|---|---|
| 2,705,161 A * | 3/1955 | Shafer | ...................... | F16C 33/80 277/419 |
| 3,003,831 A * | 10/1961 | King | ...................... | B60K 17/24 180/381 |
| 4,421,187 A * | 12/1983 | Shibata | ................... | B60K 17/04 180/297 |
| 4,648,475 A * | 3/1987 | Veglia | ..................... | B60K 17/04 180/297 |
| 7,901,142 B2 * | 3/2011 | Mathis | .................... | F16C 27/04 384/535 |
| 8,070,365 B2 * | 12/2011 | Hoppert | .................. | F16C 35/00 180/380 |
| 8,544,591 B2 * | 10/2013 | Felchner | ............... | F16F 1/3849 180/312 |
| 9,254,743 B2 * | 2/2016 | Yoo | ........................ | F16C 35/047 |
| 9,366,294 B2 * | 6/2016 | Kim | ....................... | F16C 35/045 |
| 9,382,968 B2 * | 7/2016 | Paulson | | |
| 2004/0011584 A1* | 1/2004 | Henkel | ................... | B60K 17/22 180/312 |
| 2009/0211386 A1* | 8/2009 | Hayes | ..................... | B60K 17/16 74/424 |
| 2010/0065364 A1* | 3/2010 | Felchner | ............... | F16F 1/3849 180/381 |
| 2015/0093062 A1* | 4/2015 | Kim | ....................... | F16C 35/045 384/490 |
| 2015/0167744 A1* | 6/2015 | Yoo | ........................ | F16C 35/047 384/456 |
| 2017/0174077 A1* | 6/2017 | Roberts | .................. | B60K 17/24 |

* cited by examiner

*Primary Examiner* — Karen Beck

(74) *Attorney, Agent, or Firm* — Booth Udall Fuller, PLC

(57) ABSTRACT

A carrier bearing assembly includes a bracket, a mounting structure permitting the bracket to be mounted to a frame of a vehicle, an opening in the bracket extending through the bracket, from a first lateral side of the bracket to a second lateral side of the bracket, the opening substantially offset (e.g., an inch or more off center) in a direction; and a bearing fitted into the opening permitting a driveshaft of the vehicle to pass through and to substantially constrain movement of the driveshaft. Additionally, the opening can be formed as a non-straight hole allowing the driveshaft to pass through the bearing at a non-perpendicular angle. The carrier bearing assembly permits a substantial correction one more operating angle of the driveshaft by constraining the angle of a portion of the driveshaft.

18 Claims, 4 Drawing Sheets

CARRIER BEARING ASSEMBLY

BACKGROUND OF THE INVENTION

1. Field of the Invention

The present invention relates to a carrier bearing assembly useful for reducing driveshaft vibration, noise, and stress.

2. Description of the Related Art

A universal joint (U-joint) is a type of coupling in a shaft that allows the shaft to bend while transmitting torque and rotary motion between the shaft segments. FIG. 1 illustrates the concept of operating angles of a shaft having multiple U-joints. As shown in FIG. 1, a shaft segment 1 is coupled to a shaft segment 2 using U-joint A, and the shaft segment 2 is coupled to a shaft segment 3 using U-joint B. As illustrated, each shaft segment is coupled to another at an angle, called the operating angle. For instance, the operating angle between shaft segment 1 and shaft segment 2 is a degrees (a°) and the operating angle between shaft segment 2 and shaft segment 3 is b degrees (b°). It is well known that when the operating angles a° and b° are about the same, the rotational speed of the shaft segment 1 and the shaft segment 3 will be about the same, and if the shaft segment 1 is rotated at a constant rate so too will shaft segment 3. However, where the operating angles are significantly apart, the shaft segment 3 will tend to continually accelerate/deaccelerate while the entire shaft vibrates.

On vehicles where the engine is located on a different end from the drive wheels and on many 4-wheel drive vehicles, a driveshaft is used to transfer torque from the engine/transmission to the drive wheels. To permit variations in alignment, a driveshaft typically incorporates several universal joints (U-joints).

FIG. 2 illustrates a driveshaft with non-optimal operating angles. It is to be understood that while the driveshaft shown in FIG. 2 includes two U-joints, as a practical matter, it would likely have one or more additional U-joints. It is also to be realized that for illustrative purposes the operating angles shown are exaggerated. As depicted, segment 42 is attached to segment 40 via U-joint 42u, and segment 40 is attached to segment 44 via U-joint 44u. A carrier bearing 70 is mounted to the frame of the vehicle using bolts 73, and the segment 40 of the driveshaft passes through the carrier bearing 70. However, because the operating angles are markedly apart, the driveshaft will tend to vibrate excessively. In some universal task vehicles (UTV), the driveshaft will be able to move up or down an inch or more during driving, causing extreme vibration, loud noise and stress to the driveshaft. Additionally, the bearing 70 is formed as a straight 90° hole while the driveshaft passes through the bearing 70 non-linearly. Although the carrier bearing 70 constrains movement of the driveshaft somewhat, a sizeable gap 72 exists between the driveshaft and the bearing 71 to reduce stress on the driveshaft. To remedy these problems, a rubber ring is sometimes fitted onto the bearing, but this fails to reduce noise, vibration, and constant stress to the driveshaft sufficiently.

SUMMARY OF THE INVENTION

One aspect of the disclosure relates to a carrier bearing assembly, comprising a bracket; a mounting structure permitting the bracket to be mounted to a frame of a vehicle; an opening in the bracket extending through the bracket, from a first lateral side of the bracket to a second lateral side of the bracket, the opening substantially offset (e.g., an inch or more) in a direction; and a bearing fitted into the opening permitting a driveshaft of the vehicle to pass through and to substantially constrain movement of the driveshaft. Additionally, the opening in the bracket can be formed as a non-straight hole allowing the driveshaft to pass through the bearing at a non-perpendicular angle. In general, the opening can be formed at any angle suitable for reducing vibration and stress on the driveshaft. The bearing can also contain friction-reducing elements, such as ball or roller bearings. A gap between the driveshaft and the bearing can be less than about 0.01 at all times. The carrier bearing assembly can be constructed of steel or aluminum/aluminum composite material, and can further include vibration-damping elements such as a rubber ring, if desired. The carrier bearing assembly permits a substantial correction to at least one operating angle of the driveshaft by constraining the angle of a portion of the driveshaft, and is particularly well suited for on/off-road vehicles.

The mounting structure can include bolting to secure the bracket to the frame of the vehicle, such as at least two bolts, the at least two bolts extending through the bracket from a top side to a bottom side of the bracket so as to attach the bracket to corresponding mounting holes in the frame. The bolts will preferably be attached to the mounting holes used by the OEM carrier bearing. The bracket can be mounted to the vehicle chassis in a method that allows a small amount of compliance at each fastening location (both bolts) to account for manufacturing variation in the OEM vehicle frame. In an embodiment, stepped bushings may be used for this purpose.

According to another aspect of the invention, a method of adjusting operating angles of a driveshaft comprises (1) removing a first carrier bearing assembly from a driveshaft of a vehicle, the driveshaft having a first set of operating angles; and (2) mounting a second carrier bearing assembly onto the driveshaft, preferably using the same mounting holes used to secure the first carrier bearing, the second carrier bearing assembly permitting the driveshaft to assume a second set of operating angles, the second set of operating angles substantially different from the first set of operating angles. The first carrier assembly can be an OEM or equivalent carrier bearing assembly and the second carrier bearing assembly the novel carrier bearing assembly as described in embodiments herein.

DETAILED DESCRIPTION OF THE INVENTION

Figure 1:
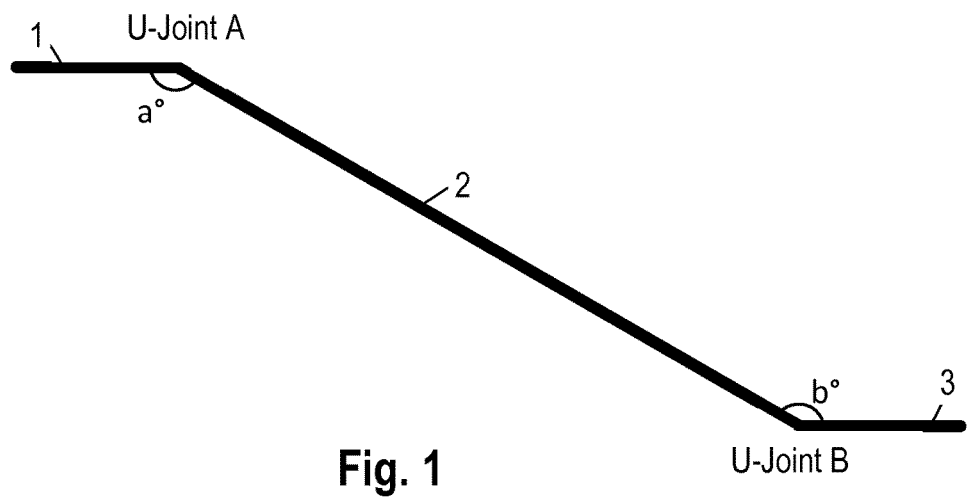
FIG. 1 is a diagram illustrating operating angles of a bent shaft having universal joint (U-joint) couplings.
Figure 2:
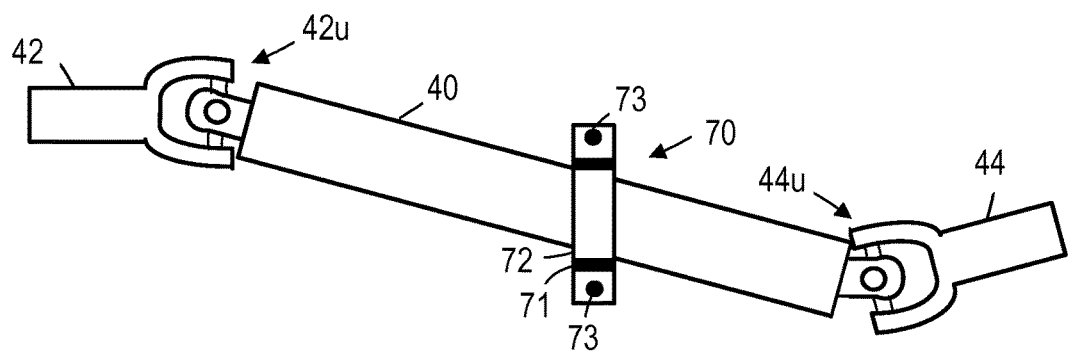
FIG. 2 illustrates a driveshaft of a vehicle with non-optimally aligned U-joints employing a prior art carrier bearing assembly.
Figure 3:
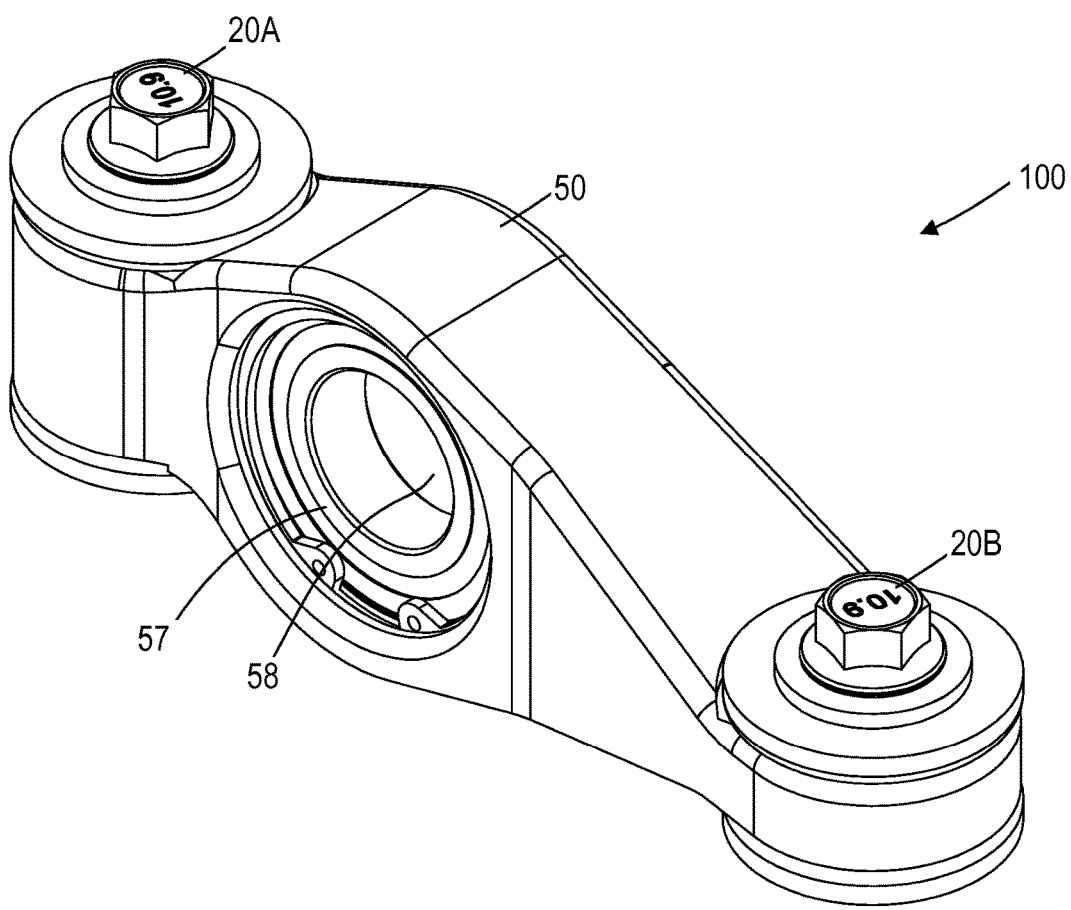
FIG. 3 illustrates a perspective view of a carrier bearing assembly, according to an embodiment.

Referring to FIG. 3, a perspective view of a carrier bearing assembly 100, according to an embodiment, is illustrated. The carrier bearing assembly 100 includes a bracket 50 that can be constructed entirely from steel or aluminum/aluminum composite material, for example. The bracket 50 can be bolted to the frame of a vehicle, using bolts 20A and 20B. When replacing the original carrier bearing assembly, the bolts 20A and 20B will preferably screw into the original carrier bearing mounting holes. As shown, the carrier bearing assembly 100 includes a bearing 57, and a driveshaft hole 58 wherein the driveshaft of the vehicle can pass through.

Figure 4:
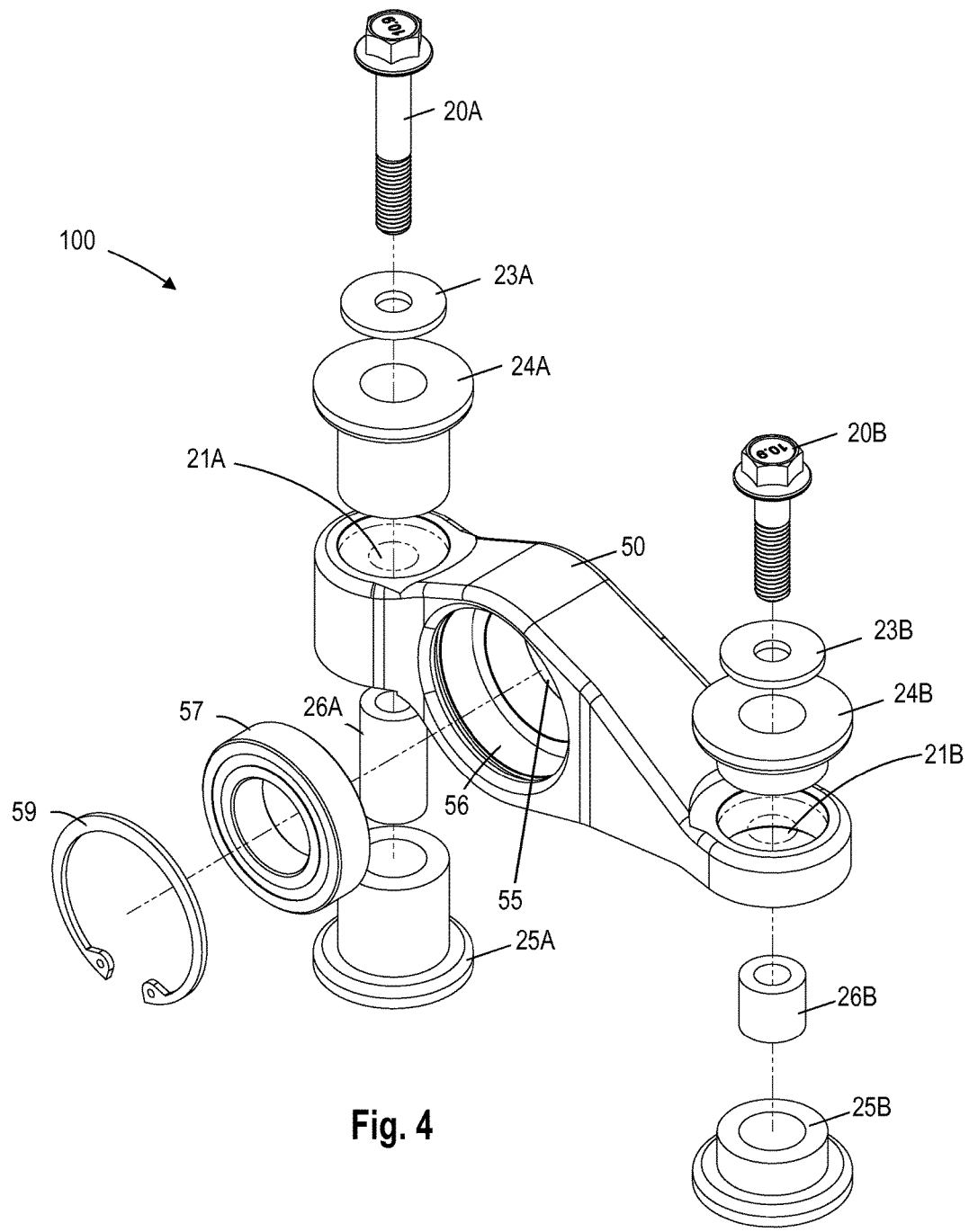
FIG. 4 illustrates an exploded view of the carrier bearing assembly of FIG. 3.

Referring to FIG. 4, an exploded view of the carrier bearing assembly 100 is illustrated. As shown, the mounting structure used to mount the carrier bearing assembly 100 onto the vehicle frame includes the bolts 20A, 20B and corresponding stepped bushing pairs 24A/26A and 24B/25B. The bolts 20A, 20B are disposed in bolt holes 21A, 21B, each of the bolts offset about the same distance from respective end edges of the top side. The bolts 20A and 20B can be grade 10.9, for example. Additionally bushings 26A, 26B and washers 23A, 23B can be employed. The stepped bushings provide additional compliance between the bracket 50 and the vehicle frame to account for manufacture variation and vibration. The stepped bushings may be constructed of vibration absorbing material such as rubber. In the illustrated embodiment, the bolt 20A and corresponding bushings are longer than the bolt 20B and corresponding bushings. However, it is to be understood that the lengths of the mounting components may vary depending on the vehicle that the bracket 50 is to be mounted as well as other design choices. Additionally, it is to be noted that the bushings 25A/26A and 25B/26B can also be used to raise the bracket a predetermined distance from the original position of the OEM carrier bearing assembly. Also shown in FIG. 4 is a bearing 57 which can be friction fitted into bracket opening 56, and additionally retained using a retaining ring 59 or the like. The bearing 57 can also contain friction-reducing elements, such as ball or roller bearings. Vibration-damping elements such as a rubber ring adjacent the bearing 57 can be incorporated into the design, if desired.

Figure 5:
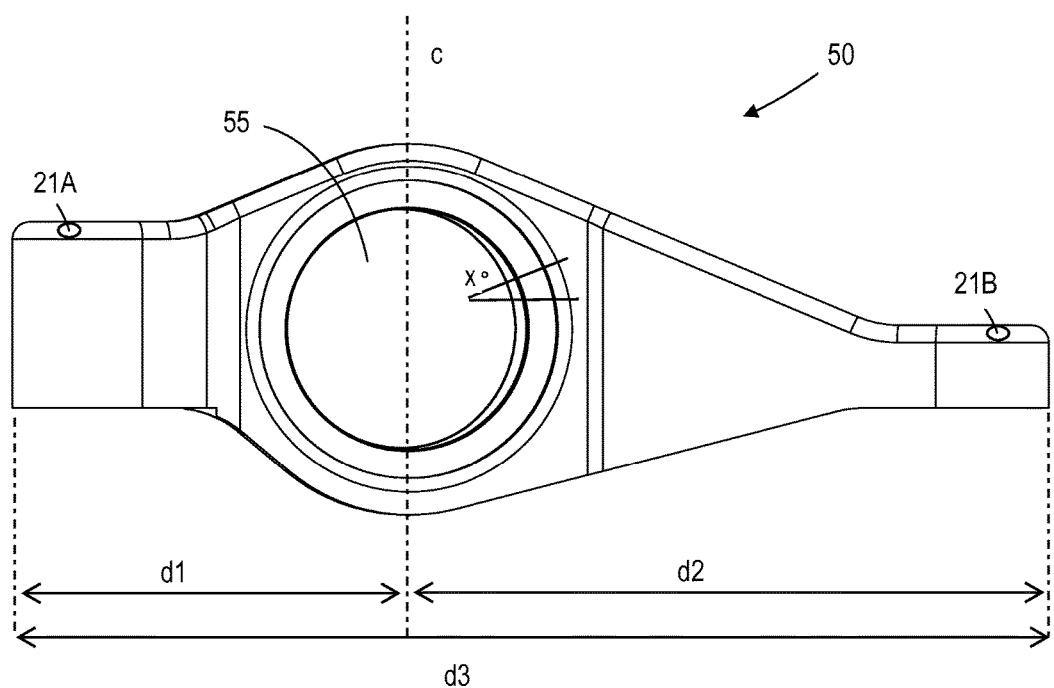
FIG. 5 illustrates a side view of the bracket of the carrier bearing assembly.

Referring to FIG. 5, a side view of the bracket 50 of the carrier bearing assembly 100 is illustrated. As shown, the bracket 50 is substantially offset (e.g., more than about one inch) from the midpoint of a lateral side of the bracket 50 in a leftward direction. In the illustrated example, the distance from center line c of the opening 55 to the left edge is d1 and the distance from the middle of the opening to the right edge is d2, where d1<d2. In this case, the distance d1 is more than one inch less than d2, such that the driveshaft of the vehicle will be urged leftward significantly. Additionally, the opening 55 is not a 90° straight hole (as in the case of prior art designs). In an embodiment, the opening 55 can be formed (e.g., by drilling, pressing, broaching, casting, molding, cutting, punching) through the bracket 50 at an angle a such that that $90° < a \leq 95°$ or $85° \leq a < 90°$. In other embodiments, the opening 55 can be formed as a straight 90° hole (i.e., where angle a is about 90°). In still other embodiments, the angle a can be any suitable angle. While the opening 55 is shown being offset in a leftward direction relative to the center of the carrier bracket 50, it is to be understood that the opening 55 could instead be offset in a rightward direction. Furthermore, while the opening 55 is shown as a non-straight hole, it is to be understood that the opening 55 could be formed as a straight hole while the bearing 57 (FIG. 4) constructed such that the driveshaft hole 58 (FIG. 3) of the bearing is formed as a non-straight hole.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A carrier bearing assembly, comprising:
    a bracket;
    a mounting structure permitting the bracket to be mounted to a frame of a vehicle;
    an opening in the bracket extending through the bracket, from a first side of the bracket to a lateral side of the bracket, the opening being offset by one inch or more in a direction of the mounting structure; and
    a bearing fitted into the opening permitting a driveshaft of the vehicle to pass through and to substantially constrain movement of the driveshaft, wherein a gap of less than 0.01 inch between the driveshaft and the bearing exists at all times.

2. The carrier bearing assembly of claim 1, wherein the bearing is at an angle a with respect to the mounting structure, where $85° \leq a < 90°$ and $90° < a \leq 95°$.

3. The carrier bearing assembly of claim 2, wherein the mounting structure includes bolting to secure the bracket to the frame of the vehicle.

4. The carrier bearing assembly of claim 3, wherein the bolting includes at least two bolts, the at least two bolts extending through the bracket from a top side to a bottom side of the bracket so as to attach the bracket to corresponding mounting holes in the frame.

5. The carrier bearing assembly of claim 4, wherein each of the bolts is offset about the same distance from respective end edges of the top side.

6. The carrier bearing assembly of claim 2, wherein the bracket and the bearing is constructed of metal.

7. The carrier bearing assembly of claim 2, wherein the offset permits a substantial correction operating angles of the driveshaft by constraining the angle of a portion of the driveshaft.

8. The carrier bearing assembly of claim 2, wherein the opening is a substantially non-straight hole.

9. The carrier bearing assembly of claim 2, wherein the bearing includes friction reducing elements.

10. The carrier bearing assembly of claim 2, wherein the vehicle is an on-off-road vehicle.

11. A carrier bearing assembly, comprising:
    a bracket;
    a mounting structure permitting the bracket to be mounted to a frame of a vehicle;
    an opening in the bracket extending through the bracket, from a first side of the bracket to a second side of the bracket; and
    a bearing fitted into the opening permitting a driveshaft of the vehicle to pass through and to substantially constrain movement of the driveshaft, wherein a gap of less than 0.01 inch between the driveshaft and the bearing exists, and wherein an angle a between the bearing and the mounting structure is $85° \leq a < 90°$ and $90° < a \leq 95°$.

12. The carrier bearing assembly of claim 11, wherein the mounting structure includes bolting to secure the bracket to the frame of the vehicle.

13. The carrier bearing assembly of claim 12, wherein the bolting includes at least two bolts, the at least two bolts extending through the bracket to attach the bracket to corresponding mounting holes in the frame.

14. The carrier bearing assembly of claim 13, wherein each of the bolts is offset about a same distance from respective end edges of the bracket.

15. The carrier bearing assembly of claim 11, wherein the opening is offset by one inch or more in a direction of the mounting structure.

16. The carrier bearing assembly of claim 11, wherein the bracket and the bearing is constructed of metal.

17. The carrier bearing assembly of claim 15, wherein the offset corrects operating angles of the driveshaft by constraining the angle of a portion of the driveshaft.

18. The carrier bearing assembly of claim 11, wherein the bearing includes friction reducing elements.

* * * * *

UNITED STATES PATENT AND TRADEMARK OFFICE
CERTIFICATE OF CORRECTION

PATENT NO. : 9,956,872 B2
APPLICATION NO. : 14/952741
DATED : May 1, 2018
INVENTOR(S) : Jonathan Roberts and Brent Reynolds Page 1 of 1

It is certified that error appears in the above-identified patent and that said Letters Patent is hereby corrected as shown below:

In the Claims

Column 4 Line 10 Claim 1 delete "to a lateral side" and insert -- to a second side --.

Signed and Sealed this
Fifth Day of June, 2018

Andrei Iancu
*Director of the United States Patent and Trademark Office*